Jan. 10, 1933.     O. K. STEPHENS     1,893,602

PRODUCTION CONTROL ASSEMBLY

Filed May 31, 1930     2 Sheets-Sheet 1

Inventor

Oscar K. Stephens

By Lyon & Lyon

Attorneys

Jan. 10, 1933.     O. K. STEPHENS     1,893,602
PRODUCTION CONTROL ASSEMBLY
Filed May 31, 1930     2 Sheets-Sheet 2

Inventor
Oscar K. Stephens
By Lyon & Lyon
Attorneys

Patented Jan. 10, 1933

1,893,602

UNITED STATES PATENT OFFICE

OSCAR KEZER STEPHENS, OF SAN GABRIEL, CALIFORNIA

PRODUCTION CONTROL ASSEMBLY

Application filed May 31, 1930. Serial No. 457,936.

This invention relates to a production control assembly, such as employed for controlling the flow of oil, or gas, from producing oil wells.

According to the present practice, a production control assembly for oil wells usually includes a considerable number of valves, cross T's, needle valves, and other valves which are employed as pipe connections supported on the casing head for controlling the flow. This practice entails the use of a great number of threaded joints which must be tight under high pressure, and the many pipe fittings and threads made necessary by this practice are a source of trouble and danger, especially in case of a fire occurring at the well.

The general object of this invention is to provide a compact control assembly which will avoid the necessity of employing a multiplicity of valves and pipe connections, such as now employed; also to provide a production control assembly in which the flow nipples and shut-off valves are mounted so as to enable flow nipples to be removed for repair without necessitating the shutting off of the flow from the well.

A further object of the invention is to provide an improved construction for mounting the needle valves which will enable a needle valve to be repacked without detaching it, at the same time insuring that leakage will not occur through the needle valve mounting, or bushing.

A further object of the invention is to improve the construction of shut-off valves and to provide means enabling the stems of such valves to be repacked while the valves are in use.

Further objects of the invention will appear hereinafter.

The invention consists of novel parts and combinations of parts to be described hereinafter, all of which contribute to produce an efficient production control assembly.

A preferred embodiment of the invention is described in the following specification, while the broad scope of the invention is pointed out in the appended claims.

In the drawings—

Before proceeding with a detailed description of the invention, it should be stated that it is now common practice to provide a casing head with a considerable number of valves connected to it and connect it up to a number of smaller valves, pipe fittings, and flow nipples for controlling the flow of oil, or gas, from the well. This practice entails the use of a great number of individual valves and fittings connected up into a pipe system and makes it difficult to repack valves and also greatly multiplies the chances of leakages occurring under high pressures, such as frequently occur in controlling the production from a well that has come in under pressure.

In practicing my invention, I provide an upright body in which I mount all the valves that are necessary for controlling the flow from the well, and these valves are mounted in such a way as to enable substantially all of the flow nipples to be readily replaced if the same should become eroded by sand carried in the oil, or gas.

I also mount the shut-off valves in the flow nipples in such a way that they can readily be repacked without causing a leak to occur.

Figure 1:
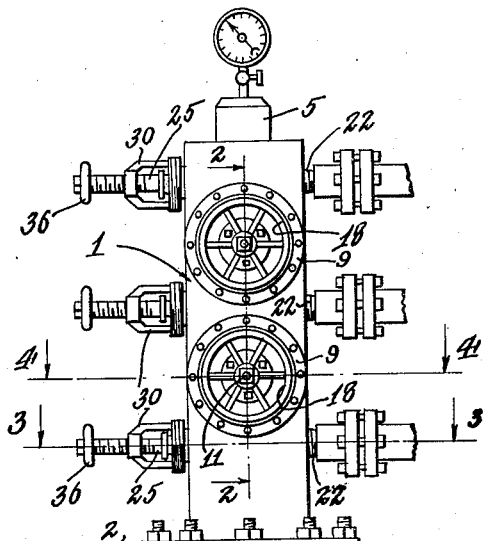
Figure 1 is a front elevation of a production control assembly, certain parts being broken away of my invention.
Figure 2:
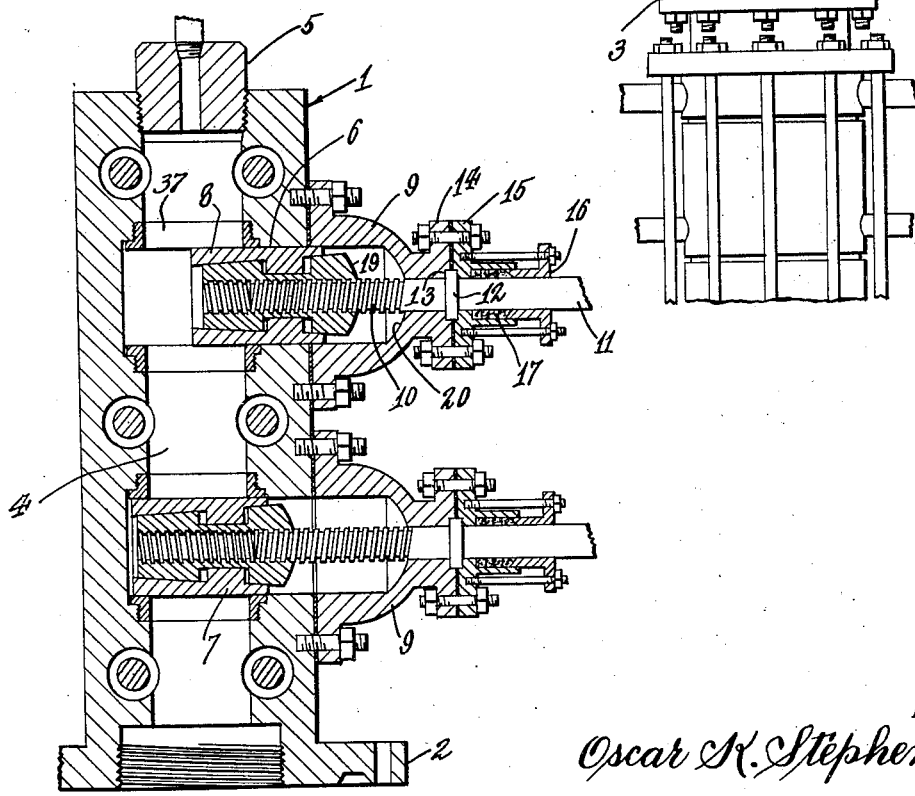
Figure 2 is a vertical section upon an enlarged scale through the assembly taken on the line 2—2 of Figure 1.
Figure 3:
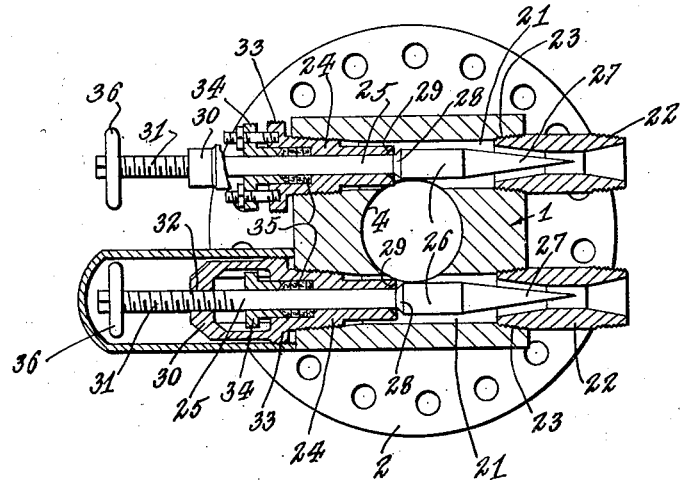
Figure 3 is a horizontal section upon an enlarged scale taken on the line 3—3 of Figure 1, and illustrating the lowest set of needle valves of the assembly, certain parts being broken away.
Figure 4:
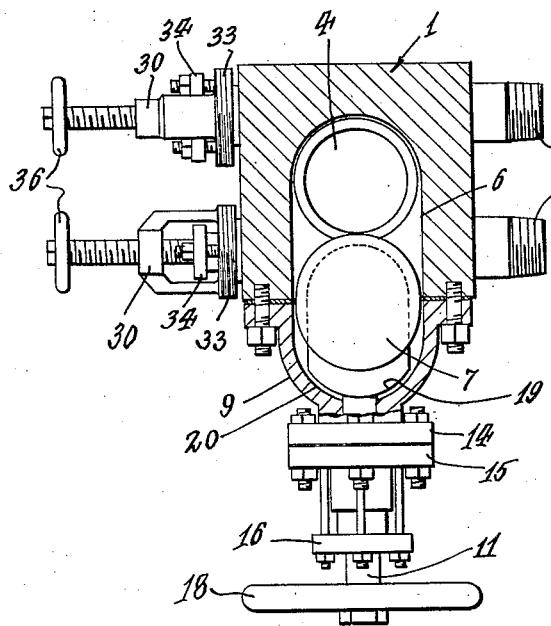
Figure 4 is a horizontal section upon an enlarged scale taken on the line 4—4 of Figure 1.

Referring more particularly to the parts, and especially to Figures 1 and 2, 1 indicates a control head which is in the form of a substantial upright cylinder capable of withstanding high internal pressure, and provided at its lower end with a flange 2 that bolts onto flange 3 of a landing head. This body, or housing, 1 is formed with a passage 4 that extends up through it from below, the upper end being closed by a removable threaded plug 5. In the side wall of the body 1, guide openings 6 are formed for a pair of gate valves 7 and 8 and over the openings 6 on the side of the body 1, I provide bonnets 9 into which the gates 7 and 8 may be withdrawn when it is necessary to run a swab down the well. At such a time, the plug 5 will be removed.

Each of the gate valves, or gates, 8 is mounted on threads 10 formed on a stem 11, the said stem being provided with an integral collar 12. This collar seats in a counterbore 13 of small diameter in the flange 14 of the bonnet and is held in place by stuffing box 15 that is bolted onto the flange of the bonnet and through which the stem 11 passes. This stuffing box carries packing means which may include a gland 16 that holds packing rings 17 in place in the stuffing box.

Each valve stem 11 is provided with a hand wheel 18, or other means for rotating it. The gate valves 7 and 8 are alike in construction and when the valves 7 and 8 are wide open, the gates 7 and 8 pass into the bonnets 9 and leave the bore, or passage, 4 through the body, clear.

When it is necessary to remove the packing ring 17, the valve stem 11 can be rotated in a direction to move the valve gate outwardly until the rear face 19 of the gate engages the face 20 in the valve bonnet. If considerable force is employed at this time, the collar 12 will be pressed with great force into the recess 13, thereby packing the valve stem at the collar; or, if desired, the valve may be screwed up tightly, in which case the collar 12 will be forced outwardly with considerable pressure against the inner face of the stuffing box 15, which is preferably provided with a recess like the recess 13 to receive the collar. This will substantially pack the stem at the collar while the packing rings 17 are being removed, after removing the gland 16.

Between the two gate valves, I provide two needle valve chambers 21, which are located respectively on opposite sides of the passage 4 and formed in the heavy wall of the body 1. These chambers are preferably in the form of bores with their axes located transversely to the axes of the gate valves. In other words, at right angles to the valve stems 11. Each needle valve chamber 21 communicates with the passage 4. At one end of each needle valve chamber 21, I provide a flow nipple 22 which may be secured in place by means of a tapered thread 23 received in a tapered socket or "box". In the other end of each needle valve chamber 21, I provide a valve bushing 24 that carries the stem 25 of the needle valve, each stem being provided with a needle valve head 26 with the usual conical tip 27 to cooperate with the conical passage through the flow nipple. At the outer end of the head 26 where the head joins the stem 25, I form a shoulder 28 which is preferably conical in form and on its inner end each bushing is provided with a conical seat 29 to receive this shoulder 28. Each bushing 24 is mounted by means of threads in the side of the body 1 that lies opposite to the flow nipples, and each bushing is provided with a valve stem guide 30 and is provided with means for moving the stem 25 in or out to regulate the amount of flow through the flow nipple. In the present instance, each stem 25 is provided with threads 31 received in a threaded opening 32 in the guide. The outer end of the bushing is formed into a stuffing box 33 receiving a gland 34 to tighten up packing rings 35.

A lever or hand wheel 36 is provided on the end of each stem to rotate it. If the valve stem is rotated in a direction to move a needle valve head 26 outwardly, the conical shoulder 28 can be seated firmly on the seat 29 so as to substantially prevent leakage while the packing 35 is being renewed.

I prefer to provide a pair of these needle valves between the two gate valves and another pair below the lower gate valve and another pair above the uppermost gate valve. This arrangement enables all the needle valves except the lowest pair to be removed when desired without shutting down the flow from the well. This is very advantageous because flow-nipples are subject to considerable erosion from sand and grit carried with the oil, or gas, particularly where the pressure handled is high. The lowest pair of needle valves would only be used in an emergency or when it is necessary to make repairs in the needle valves that are located between the two gate valves.

In practicing the invention, any number of shut-off valves and flow valves may be employed. In other words, I may use a plurality of shut-off valves with a plurality of flow valves located between the shut-off valves.

If desired, the passage 4 may be provided with bushings 37 across which the faces of the gate valves slide. These bushings would be inserted through the guide openings 6 in the side of the housing, or body, 1.

By closing the lower gate valve 7, flow will be shut off to the upper gate 8, enabling repairs to be made to the upper gate valve and upper nipples. When both gate valves are held open, gas or oil can be taken off through all the flow nipples.

It is understood that the embodiment of the invention described herein is only one of the many embodiments this invention may take, and I do not wish to be limited in the practice of the invention, nor in my claims, to the particular embodiment set forth.

What I claim is:

1. In a production control assembly, the combination of a housing in the form of an upright body having a passage extending upwardly therethrough for the oil or gas, said body having a transverse chamber therein at each side of the said passage and communicating with the passage, a flow-nipple mounted in the end of each of said chambers, a needle-valve corresponding to each flow-nipple and mounted in its corresponding chamber, each needle-valve having a stem passing out through the said body on the side opposite its corresponding flow-nipple, and means mounted on the body for regulating the position of the needle-valves.

2. In a production control assembly, the combination of a housing in the form of an upright body having a passage extending upwardly therethrough for the oil or gas, said body having a transverse chamber therein at each side of the said passage and communicating with the passage, a flow-nipple mounted in the end of each of said chambers, a needle-valve corresponding to each flow-nipple and mounted in its corresponding chamber, each needle-valve having a stem passing out through the said body on the side opposite to its corresponding flow-nipple, and having a head within its corresponding chamber with a shoulder formed at the end of the head adjacent the stem, a bushing corresponding to each stem receiving the same and mounted in the said body, each bushing having a seat at its inner end for the said shoulder, and means mounted on the body for moving the stem in or out to regulate the flow through the flow-nipple and capable of drawing the stem outwardly to seat the shoulder forcibly on its seat, and packing means carried by the outer end of each bushing.

3. In a production control assembly, the combination of a control head in the form of an upright body having a passage extending upwardly therethrough for the oil or gas, said body having a transverse chamber therein located to one side of said passage and communicating therewith, a flow-nipple mounted in the end of said chamber at one side of said body, a bushing mounted at the other end of said chamber at the other side of said body and having a seat formed at its inner end, a needle valve having a head in said chamber to cooperate with the flow-nipple and having a stem passing outwardly through said bushing, said head having a shoulder adjacent said seat, packing means mounted in the outer end of said bushing, and means mounted on said body for moving the stem in or out to regulate the flow through the flow-nipple, and capable of drawing the stem outwardly to seat the said shoulder forcibly on said seat to pack the stem at the inner end of the bushing temporarily, to facilitate the renewal of the said packing means without leakage occurring along the stem and through the bushing.

4. In a production control assembly, the combination of a housing in the form of an upright body having a passage extending upwardly therethrough for the oil or gas, a pair of shut-off valves mounted in said body, one above the other, said body having a pair of chambers located between the shut-off valves extending through the said body on axes transverse to the axes of said shut-off valves and communicating with the said passage, flow-nipples corresponding to said chambers and mounted on the side of said body, needle valves mounted respectively in said chambers and having stems extending out through the side of said body remote from the flow-nipples.

5. In a production control assembly, the combination of a housing in the form of an upright body having a passage extending upwardly therethrough for the oil or gas, a pair of shut-off valves mounted in said body, one above the other, said body having a pair of chambers located between the shut-off valves, extending through the said body on axes transverse to the axes of said shut-off valves and communicating with the said passage, flow-nipples corresponding to said chambers and mounted on the side of said body, needle valves mounted respectively in said chambers and having stems extending out through the side of said body remote from the flow-nipples, said body further having a pair of needle valve chambers disposed above the upper gate valve with needle valves cooperating therewith.

6. In a production control assembly, the combination of a housing in the form of an upright body having a passage extending upwardly therethrough for the oil or gas, a pair of shut-off valves mounted in said body, one above the other, said body having a pair of chambers located between the shut-off valves, extending through the said body on axes transverse to the axes of said shut-off valves and communicating with the said passage, flow-nipples corresponding to said chambers and mounted on the side of said body, needle valves mounted respectively in said chambers and having stems extending out through the side of said body remote from the flow-nipples, said body further having a pair of needle valve chambers formed in said body below the lower gate valve with flow-nipples and needle-valves corresponding thereto.

7. In a production control assembly, the combination of a housing in the form of an upright body having a passage extending upwardly therethrough for the oil or gas, said body having a transverse chamber therein at the side of the said passage and communicating with the passage, a flow nipple mounted in the end of the said chamber, a needle valve mounted in the chamber and having a stem passing out through the said body on the side opposite to the flow nipple, and means for regulating the position of the needle valve.

8. In a production control assembly, the combination of a housing in the form of an upright body having a passage extending upwardly therethrough for the oil or gas, said body having a transverse chamber therein at the side of the said passage and communicating with the passage, a flow nipple mounted in the end of the said chamber, a needle valve mounted in the chamber and having a stem passing out through the said body on the side opposite to the flow nipple, means for regulating the position of the needle valve, and means for packing the said stem.

9. In a production control assembly, the combination of a control head in the form of an upright body having a passage extending upwardly therethrough for the oil or gas, said body having a transverse chamber therein located to one side of said passage and communicating therewith, a flow-nipple mounted in the end of said chamber at one side of said body, a bushing mounted at the other end of said chamber at the other side of said body, a needle valve in said chamber to cooperate with the flow-nipple, and having a stem passing outwardly through said bushing, packing means mounted in the other end of said bushing, and means cooperating with the said stem for moving the stem in or out to regulate the flow through the flow-nipple.

OSCAR KEZER STEPHENS.